(12) United States Patent
Kojima (10) Patent No.: US 6,933,734 B2
(45) Date of Patent: Aug. 23, 2005

(54) VEHICLE CONTROLLER

(75) Inventor: Shigeru Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/814,644

(22) Filed: Apr. 1, 2004

(65) Prior Publication Data

US 2005/0001635 A1 Jan. 6, 2005

(30) Foreign Application Priority Data

Jul. 4, 2003 (JP) ........................................ 2003-191567

(51) Int. Cl.⁷ .......................... G01R 27/08; G06F 17/00
(52) U.S. Cl. ........................................ 324/713; 701/22
(58) Field of Search ................................ 324/713, 691, 324/649, 600; 701/22; 180/65.1, 65.2, 65.3, 65.4, 65.5, 65.6, 65.7, 65.8; 318/375, 376, 379, 380, 139, 471

(56) References Cited

U.S. PATENT DOCUMENTS

| | | | | |
|---|---|---|---|---|
| 5,719,519 A | * | 2/1998 | Berringer | ..................... 327/423 |
| 5,951,616 A | * | 9/1999 | Chiba et al. | .................... 701/58 |
| 6,166,512 A | | 12/2000 | Kojima | |
| 6,260,665 B1 | * | 7/2001 | Kramer et al. | .......... 188/1.11 L |
| 6,603,307 B2 | * | 8/2003 | Sekiya et al. | ................ 324/225 |
| 6,627,859 B1 | * | 9/2003 | Kasai et al. | ................ 219/505 |
| 2003/0130772 A1 | * | 7/2003 | Yanagida et al. | ............. 701/22 |

FOREIGN PATENT DOCUMENTS

| | | |
|---|---|---|
| JP | 08-196001 A | 7/1996 |
| JP | 10-225158 A | 8/1998 |

* cited by examiner

*Primary Examiner*—Anjan Deb
*Assistant Examiner*—Hoai-An D. Nguyen
(74) *Attorney, Agent, or Firm*—Sughrue Mion, PLLC (57) ABSTRACT

The vehicle controller performs the overheat detection on the resistor of an electric vehicle that consumes power generated at a time of braking as Joule heat of the resistor, and includes: a calculator (15) for calculating a resistance value (R) of the braking resistor (11) from a current value (I) of a current flowing through a braking resistor (11) and a voltage value (V) of a voltage generated between both ends of the braking resistor (11); and a comparator (16) for comparing the resistance value (R) calculated by the calculator (15) and a resistance value (Rmax) at an allowable temperature of the braking resistor (11) that has been calculated in advance, and when the resistance value (R) is larger, judging that the overheat is detected from the braking resistor (11).

4 Claims, 7 Drawing Sheets

VEHICLE CONTROLLER

BACKGROUND OF THE INVENTION

1. Field of the Invention

The present invention relates to a vehicle controller, and more particularly to a vehicle controller which performs overheat detection on a braking resistor when performing rheostatic braking control of an electric vehicle such as a railroad car.

2. Description of the Related Art

Up to now, a conventional vehicle controller uses power converting means to convert rotational energy of a motor into DC power at the time of braking control, and uses a braking resistor to consume the power as Joule heat (see, for example, JP 11-215605 A (page 4 and FIG. 1)).

The conventional vehicle controller has a problem in that when the Joule heat generated from power consumption at the braking resistor has become excessive, a temperature of the braking resistor also becomes high, resulting in burnout or smoking of the braking resistor.

In view of this, it is desirable to allow overheat detection on the braking resistor. However, for the purpose of the overheat detection, a temperature sensor needs to be provided in order to measure the temperature of the braking resistor, causing another problem in that the vehicle controller becomes expensive.

SUMMARY OF THE INVENTION

The present invention has been made in order to solve the above problems, and therefore has an object to obtain a vehicle controller which performs overheat detection on a braking resistor without additionally providing a temperature sensor.

With the above object(s) in view, according to the present invention, a vehicle controller, which performs overheat detection on a resistor of an electric vehicle that consumes power generated at a time of braking as Joule heat of the resistor, includes current detecting means for detecting a current value of a current flowing through the resistor and voltage detecting means for detecting a voltage value of a voltage generated between both ends of the resistor. The vehicle controller also includes resistance value calculating means for calculating a resistance value of the resistor based on the current value and the voltage value. Also, the vehicle controller includes overheat detecting means for comparing the resistance value calculated by the resistance value calculating means and a resistance value at an allowable temperature of the resistor, and when the resistance value calculated by the resistance value calculating means is larger, judging that overheat is detected from the resistor.

Consequently, the overheat detection can be performed on the braking resistor using the current value and the voltage value without additionally providing the temperature sensor.

DETAILED DESCRIPTION OF THE PREFERRED EMBODIMENTS

Embodiment 1

Figure 1:
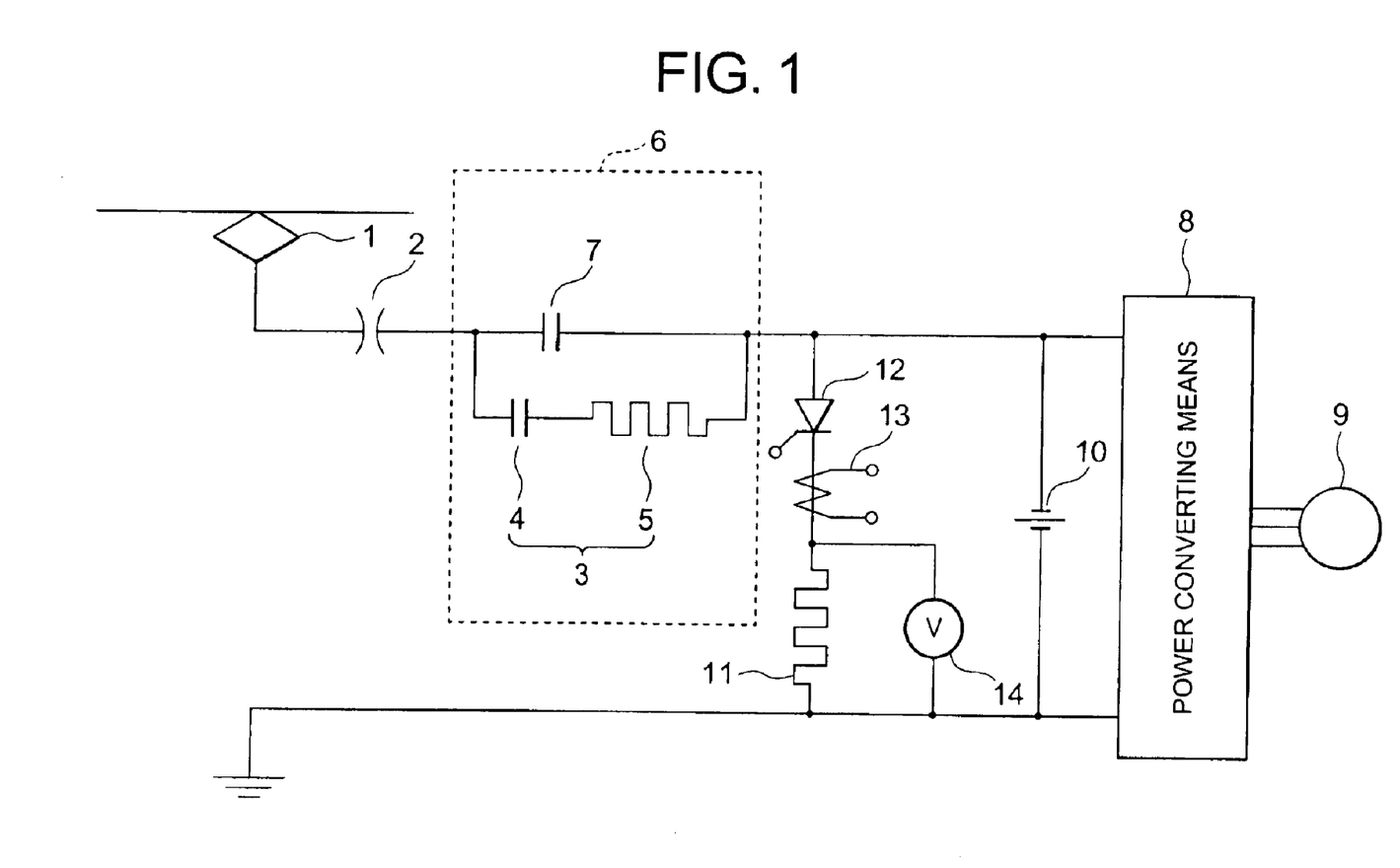
FIG. 1 is a circuit diagram showing a configuration of a vehicle controller according to Embodiment 1 of the present invention.

FIG. 1 shows a vehicle controller according to Embodiment 1 of the present invention. As shown in FIG. 1, a high speed circuit breaker 2 for interrupting an abnormal current is connected to a DC electric overhead line 1. A series circuit 3 is connected to the high speed circuit breaker 2, and includes a switch 4 and a charging resistance 5. A switch 7 is connected in parallel to the series circuit 3. The series circuit 3 and the switch 7 connected in parallel to the series circuit 3 compose a parallel circuit 6. Power converting means 8 includes an inverter for controlling a motor 9, and is supplied with power from the DC electric overhead line 1 via the high speed circuit breaker 2 and the parallel circuit 6. The power converting means 8 also includes switching elements such as an insulated gate bipolar transistor (hereinafter, referred to as "IGBT"). A filter capacitor 10 is connected in parallel to the power converting means 8. A braking resistor 11 is connected in parallel to the power converting means 8 via a semiconductor switch 12. The braking resistor 11 serves to consume the power generated at the time of braking an electric vehicle as Joule heat. Note that the semiconductor switch 12 connected in series to the braking resistor 11 serves to control the Joule heat, and is formed of, for example, a thyristor. The braking resistor 11 is also connected in series to a current sensor 13 and in parallel to a voltage sensor 14.

In the vehicle controller thus configured, a current value (I) of a current flowing through the braking resistor 11 can be detected by the current sensor 13, and as a result, a voltage value (V) of a voltage generated between both ends of the braking resistor 11 can be detected by the voltage sensor 14.

Figure 2:
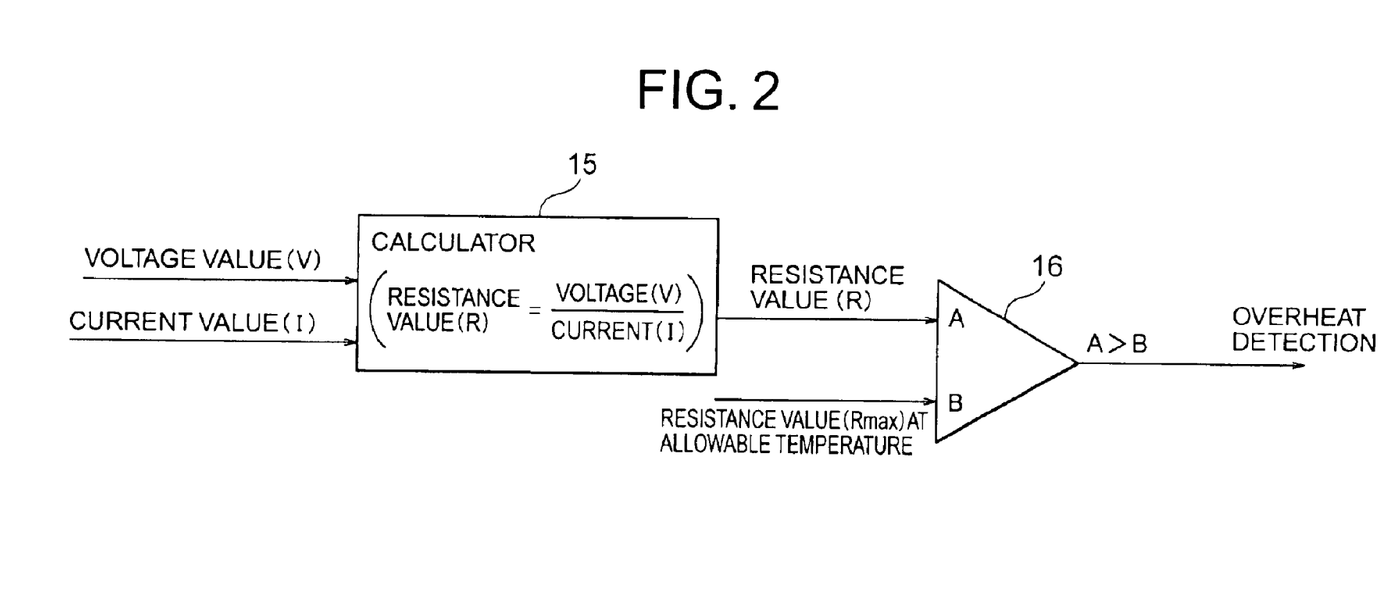
FIG. 2 is an explanatory diagram showing a logical structure of overheat detection for the vehicle controller according to Embodiment 1 of the present invention.

FIG. 2 shows a logic for detecting overheat using the current value (I) and the voltage value (V) thus detected. As shown in FIG. 2, a calculator 15 is connected to a comparator 16.

With this configuration, the detected current value (I) and voltage value (V) are first inputted into the calculator 15. Then, the calculator 15 uses the current value (I) and the voltage value (V) to calculate a resistance value (R) of the braking resistor 11 based on the following expression (1).

$$\text{Resistance value } (R) \text{ of braking resistor} = \text{Voltage value } (V)/\text{Current value } (I) \quad (1)$$

Meanwhile, assuming that: a resistance value of a resistor element forming the braking resistor 11 at 20° C. is (R20); a temperature coefficient of the resistor element is (K); an allowable temperature of the resistor element is (Tmax); and a resistance value of the resistor element at the allowable temperature (Tmax) is (Rmax), the following relational expression (2) can be obtained.

$$\text{Resistance value } (R\text{max}) = R20 + K(T\text{max} - 20) \quad (2)$$

Next, the resistance value (R) calculated by the calculator 15 and the resistance value (Rmax) of the resistor element at the allowable temperature (Tmax) that has been calculated using the above expression (2) in advance are inputted to the comparator 16. The comparator 16 compares the resistance value (R) and the resistance value (Rmax) at the allowable temperature. When the calculated resistance value (R) is larger, the comparator 16 judges that the overheat is detected.

As described above, in the vehicle controller according to Embodiment 1, overheat detection can be performed on the braking resistor 11 using only the current sensor 13 and the voltage sensor 14 without particularly providing the braking resistor 11 with the temperature sensor or the like. Accordingly, the vehicle controller can be structured at low cost.

Embodiment 2

Figure 3:
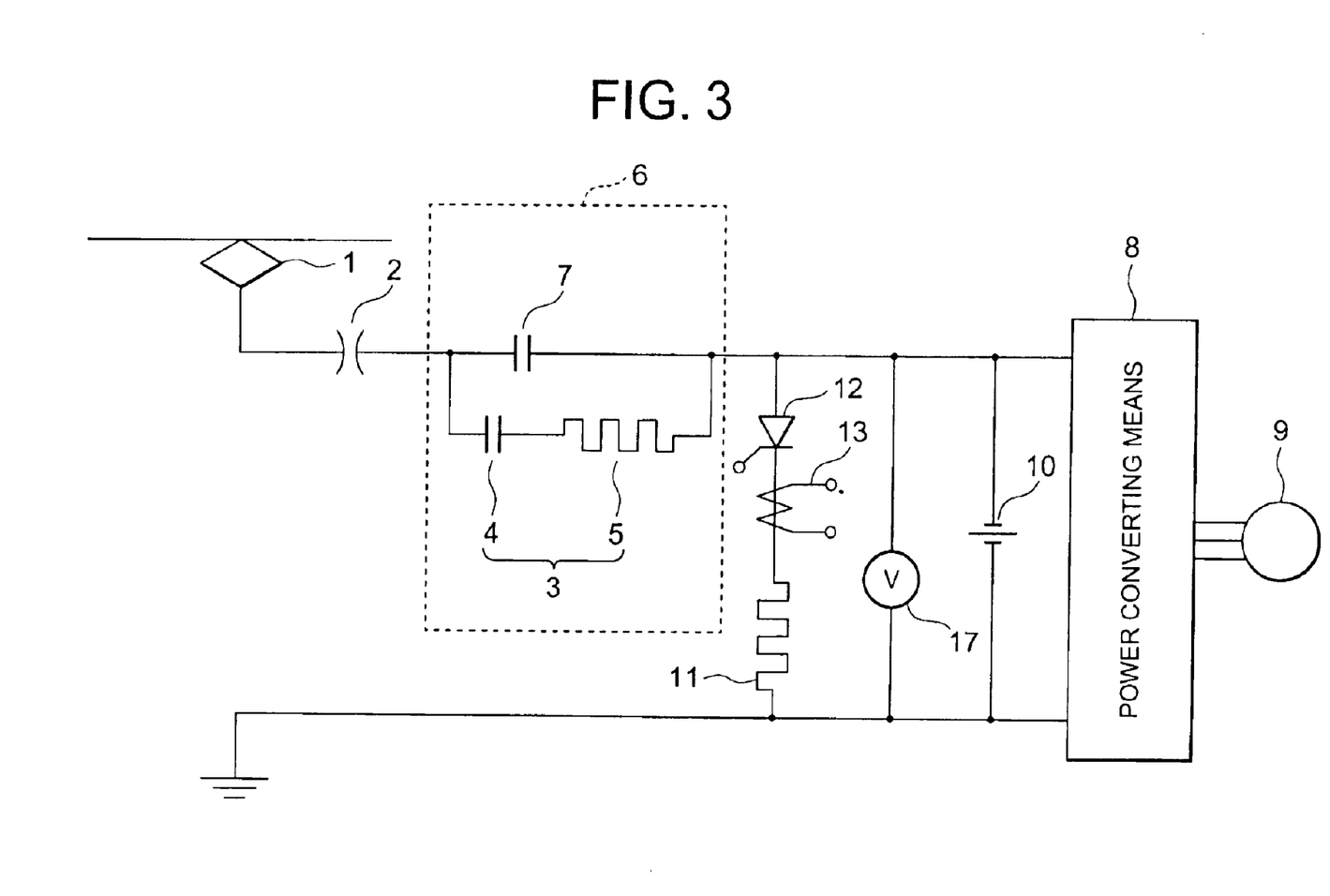
FIG. 3 is a circuit diagram showing a configuration of a vehicle controller according to Embodiment 2 of the present invention.

In Embodiment 1, the voltage sensor 14 is connected in parallel only to the braking resistor 11, but as shown in FIG. 3, a voltage sensor 17 may be connected in parallel to the filter capacitor 10. Accordingly, according to Embodiment 2, a DC circuit voltage value equivalent to the voltage value (V) of the voltage generated between both ends of the braking resistor 11 is used to perform the overheat detection on the braking resistor 11. Other components are the same as in FIG. 1. Thus, their descriptions are omitted here.

In FIG. 3, when the semiconductor switch 12 is in an on state, a current is caused to flow through the braking resistor 11. At this time, a voltage value of a voltage applied to both ends of the semiconductor switch 12 is several volts, which is much smaller than a voltage of the DC electric overhead line 1 and can be neglected. Thus, a voltage (V') detected by the voltage sensor 17 is substantially the same as the voltage (V) generated between both ends of the braking resistor 11. Accordingly, in Embodiment 2, a total voltage value of the voltage generated between both ends of the braking resistor 11 and the voltage generated between both ends of the semiconductor switch 12 is assumed to be equivalent to the voltage value of the voltage generated between both ends of the braking resistor 11 upon the detection. As a result, also in a circuit according to Embodiment 2 shown in FIG. 3, the current value (I) detected by the current sensor 13 and the voltage (V') detected by the voltage sensor 17 can be used to perform the overheat detection based on a logical structure of FIG. 2 similarly to Embodiment 1.

As described above, in the vehicle controller according to Embodiment 2, similarly to Embodiment 1, the overheat detection can be performed using only the current sensor 13 and the voltage sensor 17 without particularly providing the braking resistor 11 with the temperature sensor or the like. Accordingly, the vehicle controller can be structured at low cost.

Embodiment 3

Figure 4:
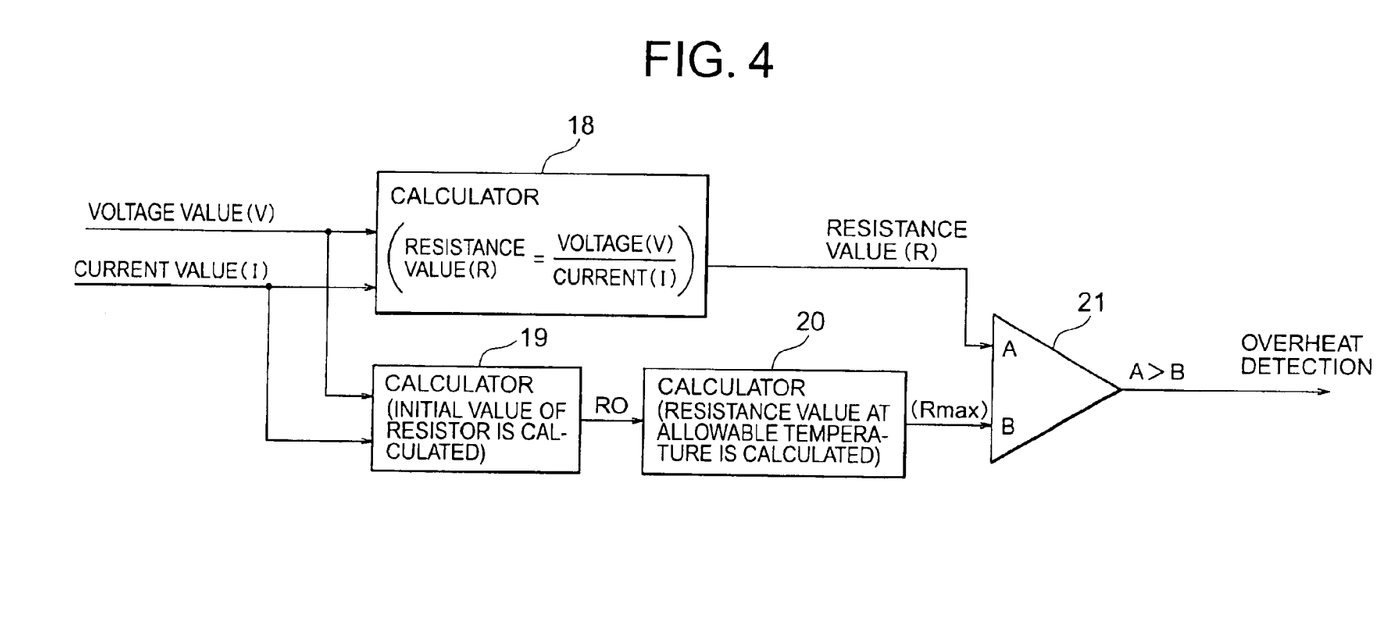
FIG. 4 is an explanatory diagram showing a logical structure of overheat detection for a vehicle controller according to Embodiment 3 of the present invention.

FIG. 4 shows a logical structure of overheat detection for a vehicle controller according to Embodiment 3 of the present invention. Note that the entire configuration of the vehicle controller according to Embodiment 3 is the same as the configuration of Embodiment 1 or 2 shown in FIG. 1 or 3. Thus, description of the configuration of Embodiment 3 is omitted here while referring to FIGS. 1 and 2 as necessary. Accordingly, the current value (I) used in Embodiment 3 is detected by the current sensor 13 of FIG. 1 or 3, and the voltage value (V) used in Embodiment 3 is one of the voltage value (V) and the voltage value (VI) detected by the voltage sensor 14 of FIG. 1 and the voltage sensor 17 of FIG. 3, respectively.

As shown in FIG. 4, a calculator 18 is connected in parallel to calculators 19 and 20 that are connected in series. An output from the calculator 18 is connected to one input terminal of a comparator 21, and an output of the calculator 20 is connected to the other input terminal of the comparator 21.

The calculator 18 uses the detected current value (I) and voltage value (V) to calculate the resistance value (R) of the braking resistor 11. The above-mentioned expression (1) is used for the calculation.

Meanwhile, in the case where each resistor has a different initial resistance value due to an error generated when manufacturing the braking resistor 11, the calculator 19 uses an initial current value (I0) and an initial voltage value (V0) to calculate an initial resistance value (R0) of the resistor at a temperature T0 using the following expression (3). The temperature T0 is obtained based on information of other temperatures included in the vehicle controller, for example, temperature information of a main circuit semiconductor cooler.

$$\text{Initial resistance value } (R0) = \text{Initial voltage value } (V0)/\text{Initial current value } (I0) \quad (3)$$

Further, assuming that: the temperature coefficient of the resistor element is (K); the allowable temperature of the resistor element is (Tmax); and the resistance value of the resistor element at the allowable temperature (Tmax) is (Rmax), the following relational expression (4) can be obtained.

$$\text{Resistance value } (Rmax) = R0 + K(Tmax - T0) \quad (4)$$

The calculator 20 uses the above expression (4) to calculate the resistance value (Rmax) at the allowable temperature. The comparator 21 compares the resistance value (R) calculated by the calculator 18 with the resistance value (Rmax) at the allowable temperature that has been calculated by the calculator 20. When the calculated resistance value (R) is larger, the comparator 21 judges that the overheat is detected.

As described above, in the vehicle controller according to Embodiment 3, similarly to Embodiment 1, the overheat detection can be performed using only the current sensor 13 and the voltage sensor 14 or 17 without particularly providing the braking resistor 11 with the temperature sensor or the like. Accordingly, the vehicle controller can be structured at low cost. In addition, according to Embodiment 3, in the case where each resistor has a different initial resistance value due to the error generated when manufacturing the braking resistor 11, the initial current value (I0) and the initial voltage value (V0) are used to obtain the initial resistance value (R0) of the resistor at the temperature T0, based on which the resistance value at the allowable temperature is calculated. Accordingly, the vehicle controller can perform the overheat detection more accurately.

Embodiment 4

Figure 5:
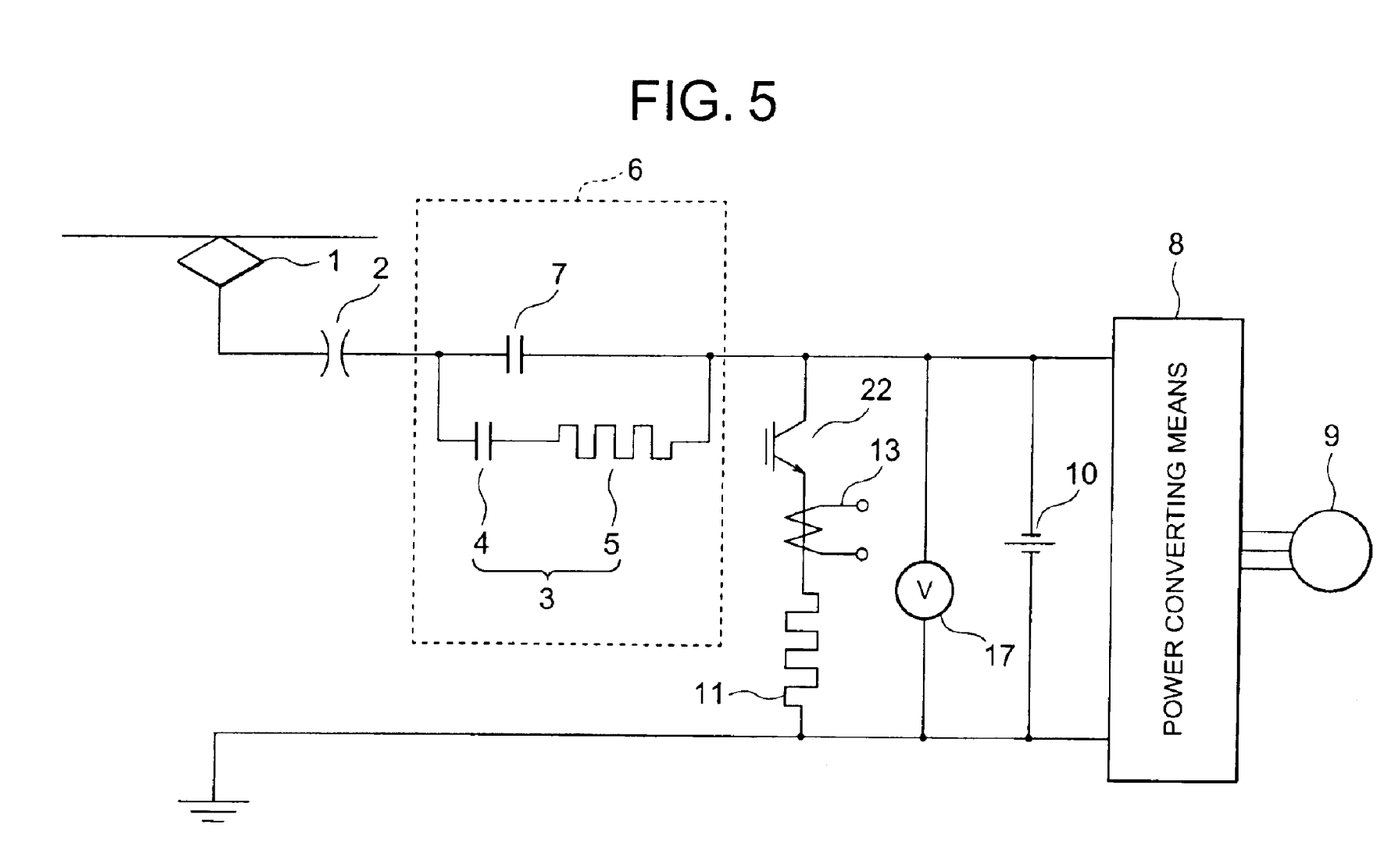
FIG. 5 is a circuit diagram showing a configuration of a vehicle controller according to Embodiment 4 of the present invention.

FIG. 5 shows a vehicle controller according to Embodiment 4 of the present invention. The configuration of the vehicle controller according to Embodiment 4 is basically the same as that of Embodiment 2 shown in FIG. 3, and is different therefrom in that a semiconductor switch 22 formed of a high-frequency switching element such as the IGBT is used instead of the semiconductor switch 12 of FIG. 3.

Figure 6:
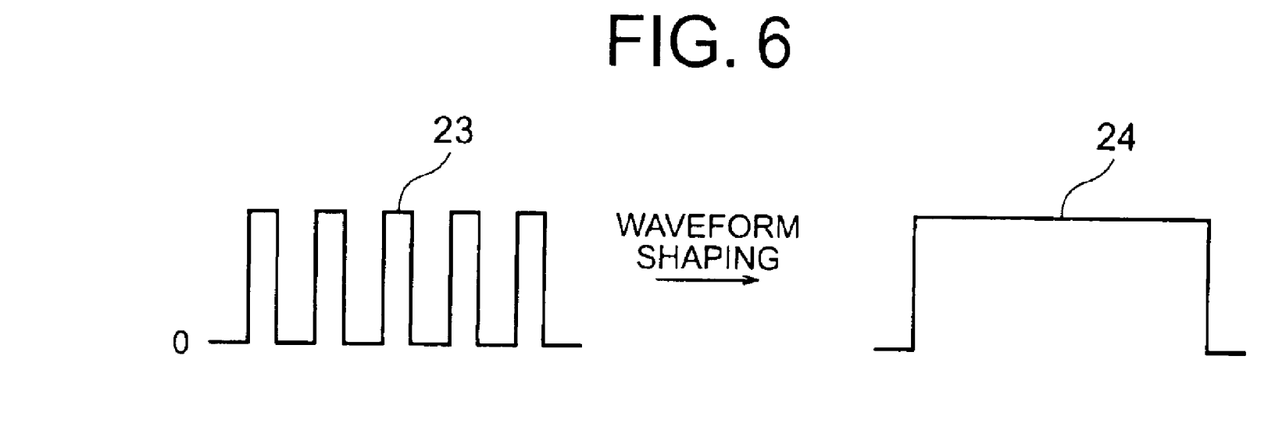
FIG. 6 is an explanatory diagram showing waveform shaping for the vehicle controller according to Embodiment 4 of the present invention.

In FIG. 5, the voltage value (V') detected by the voltage sensor 17 is a constant value irrespective of on/off actions of the semiconductor switch 22. However, a current value (I') detected by the current sensor 13 is intermittently varied depending on the on/off actions of the semiconductor switch 22, and exhibits a current waveform 23 shown on the left of FIG. 6. If a mean value or effective value of the current waveform 23 is used as the current value (I) to calculate the resistance value (R) using the above voltage value (V'), a correct resistance value (R) cannot be obtained. Therefore, a current value of a shaped waveform 24, which is obtained by an envelope of the detected current value (I') and indicates a constant value as shown on the right of FIG. 6, is used to calculated the resistance value (R).

Figure 7:
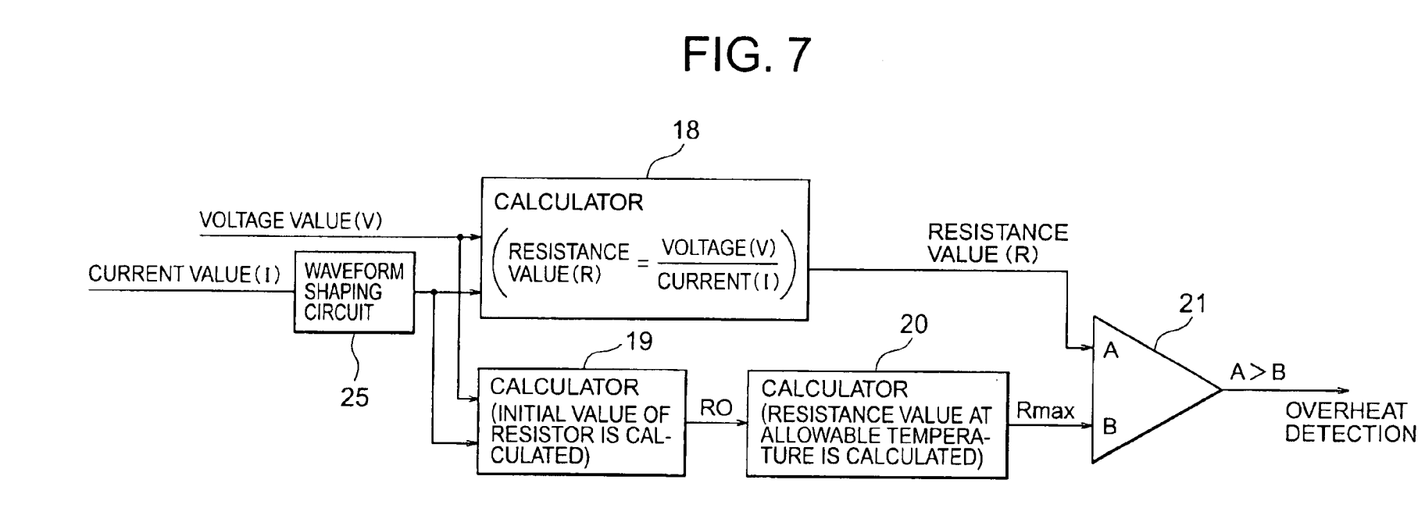
FIG. 7 is an explanatory diagram showing a logical structure of overheat detection for the vehicle controller according to Embodiment 4 of the present invention.

FIG. 7 shows a logical structure of overheat detection according to Embodiment 4. As shown in FIG. 7, a waveform shaping circuit 25 for converting the current waveform 23 into the shaped waveform 24 is added to the configuration of FIG. 4. Therefore, similarly to Embodiment 3, the overheat detection can be performed on the braking resistor 11.

More specifically, the current value (I') of the current having a current wave form detected by the current sensor 13 is first inputted into the waveform shaping circuit 25 to be converted into a current value (I) of the current having the shaped waveform 24. Then, the current value (I) thus obtained and the voltage value (V') obtained by the current sensor 17 are used to perform the same operation as that of Embodiment 3. That is, the comparator 21 compares the resistance value (R) calculated by the calculator 18 with the resistance value (Rmax) at the allowable temperature that has been calculated by the calculator 20. When the calculated resistance value (R) is larger, the comparator 21 judges that the overheat is detected.

As described above, in the vehicle controller according to Embodiment 4, similarly to Embodiment 1, the overheat detection can be performed using only the current sensor 13 and the voltage sensor 17 without particularly providing the braking resistor 11 with the temperature sensor or the like. Accordingly, the vehicle controller can be structured at low cost. In addition, according to Embodiment 4, in the case where each resistor has a different initial resistance value due to the error generated when manufacturing the braking resistor 11, the initial current value (I0) and the initial voltage value (V0) are used to obtain the initial resistance value (R0) of the resistor at the temperature T0, based on which the resistance value at the allowable temperature is calculated. Accordingly, the vehicle controller can perform the overheat detection more accurately. Further, according to Embodiment 4, the semiconductor switch 22 is formed of the high-frequency switching element such as the IGBT, and even in the case where the current value (I') detected by the current sensor 13 is intermittently varied depending on the on/off actions of the semiconductor switch 22, and exhibits the current waveform 23 shown on the left of FIG. 6, by providing the waveform shaping circuit 25 to perform the waveform shaping, the current value (I') free from intermittent variation can be obtained. Accordingly, the overheat detection can be performed similarly to Embodiments 1 to 3.

Note that in Embodiment 4, description has been made of an example in which the configuration including the semiconductor switch 22 is applied to the combination of the entire configuration of the vehicle controller according to Embodiment 2 shown in FIG. 3 and the logical structure according to Embodiment 3 shown in FIG. 4. However, there is no limitation thereto, and Embodiment 4 can be applied to any of the combinations of FIGS. 1 and 2, FIGS. 1 and 4, and FIGS. 3 and 2 which are shown in any of Embodiments 1 to 3. Any of the above combinations can produce the same effects.

What is claimed is:

1. A vehicle controller which performs overheat detection on a resistor of an electric vehicle that consumes power generated at a time of braking as Joule heat of the resistor, the vehicle controller comprising:

current detecting means for detecting a current value of a current flowing through the resistor;

voltage detecting means for detecting a voltage value of a voltage generated between both ends of the resistor;

resistance value calculating means for calculating a resistance value of the resistor based on the current value and the voltage value; and overheat detecting means for comparing the resistance value calculated by the resistance value calculating means and a resistance value at an allowable temperature of the resistor, and judging that overheat generated at the time of braking as Joule heat is detected from the resistor when the resistance value calculated by the resistance value calculating means is larger than the resistance value at an allowable temperature of the resistor.

2. A vehicle controller according to claim 1, wherein:

the resistor is arranged in series to a switching element for controlling the Joule heat; and a total voltage value of the voltage generated between both ends of the resistor and a voltage generated between both ends of the switching element is detected to be equivalent to the voltage value of the voltage generated between both ends of the resistor.

3. A vehicle controller according to claim 1, wherein the overheat detecting means includes:

an initial resistance value calculating portion for calculating an initial resistance value of the resistor based on an initial current value of a current flowing through the resistor and an initial voltage value of a voltage generated between both ends of the resistor; and an allowable temperature resistance value calculating portion for calculating a resistance value of the resistor at an allowable temperature using the initial resistance value.

4. A vehicle controller according to claim 1, further comprising waveform shaping means for obtaining a shaped waveform current that indicates a constant value from an envelope of an intermittent current that flows through the resistor and is detected by the current detecting means, and outputting a value of the shaped waveform current to the resistance value calculating means as the current value, the waveform shaping means being connected between the current detecting means and the resistance value calculating means.

* * * * *